US010982025B2

(12) United States Patent
Äärilä et al.

(10) Patent No.: US 10,982,025 B2
(45) Date of Patent: *Apr. 20, 2021

(54) PROCESS FOR PRODUCING POLYOLEFIN FILM COMPOSITION AND FILMS PREPARED THEREOF

(71) Applicant: Borealis AG, Vienna (AT)

(72) Inventors: Jari Äärilä, Porvoo (FI); Auli Nummila-Pakarinen, Porvoo (FI); Jarmo Kela, Porvoo (FI); Anh Tuan Tran, Linz (AT)

(73) Assignee: Borealis AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/348,204

(22) PCT Filed: Nov. 16, 2017

(86) PCT No.: PCT/EP2017/079369
§ 371 (c)(1),
(2) Date: May 8, 2019

(87) PCT Pub. No.: WO2018/095790
PCT Pub. Date: May 31, 2018

(65) Prior Publication Data
US 2020/0010655 A1 Jan. 9, 2020

(30) Foreign Application Priority Data

Nov. 25, 2016 (EP) ..................... 16200759

(51) Int. Cl.
| | | |
|---|---|---|
| *C08F 110/02* | (2006.01) | |
| *C08F 2/01* | (2006.01) | |
| *C08F 2/34* | (2006.01) | |
| *C08F 210/16* | (2006.01) | |
| *C08J 5/18* | (2006.01) | |
| *C08L 23/06* | (2006.01) | |
| *C08L 23/08* | (2006.01) | |
| *C08F 2/00* | (2006.01) | |
| *B29C 48/00* | (2019.01) | |
| *B01J 19/18* | (2006.01) | |
| *B29K 23/00* | (2006.01) | |
| *B29L 7/00* | (2006.01) | |

(52) U.S. Cl.
CPC ........ *C08F 110/02* (2013.01); *B29C 48/0017* (2019.02); *B29C 48/022* (2019.02); *C08F 2/001* (2013.01); *C08F 2/01* (2013.01); *C08F 2/34* (2013.01); *C08F 210/16* (2013.01); *C08J 5/18* (2013.01); *C08L 23/06* (2013.01); *C08L 23/0815* (2013.01); *B01J 19/1868* (2013.01); *B29K 2023/08* (2013.01); *B29L 2007/008* (2013.01); *C08F 2500/07* (2013.01); *C08F 2500/12* (2013.01); *C08J 2323/06* (2013.01); *C08J 2323/08* (2013.01); *C08J 2423/06* (2013.01); *C08J 2423/08* (2013.01); *C08L 2203/10* (2013.01); *C08L 2203/16* (2013.01); *C08L 2205/025* (2013.01); *C08L 2205/03* (2013.01); *C08L 2205/06* (2013.01); *C08L 2308/00* (2013.01); *C08L 2314/02* (2013.01)

(58) Field of Classification Search
CPC .. C08L 23/06; C08L 23/0815; C08L 2203/10; C08L 2203/16; C08L 2205/025; C08L 2205/03; C08L 2205/06; C08L 2308/00; C08L 2314/02; C08F 210/16; C08F 210/08; C08F 2500/12; C08F 2500/26; C08F 4/0492; C08F 2/001; C08F 4/6492; C08F 110/02; C08F 2500/07; C08F 2/01; C08F 2/34; B01J 19/1868; B29C 48/0017; B29C 48/022; B29K 2023/08; B29L 2007/008; C08J 2323/06; C08J 2323/08; C08J 2423/06; C08J 2423/08; C08J 5/18
See application file for complete search history.

(56) References Cited

U.S. PATENT DOCUMENTS

| | | |
|---|---|---|
| 3,324,093 A | 6/1967 | Alleman |
| 3,405,109 A | 10/1968 | Rohlfing |
| 4,582,816 A | 4/1986 | Miro |
| 4,588,790 A | 5/1986 | Jenkins, III et al. |
| 4,877,587 A | 10/1989 | Rhee et al. |
| 4,994,534 A | 2/1991 | Rhee et al. |
| 5,391,654 A | 2/1995 | Ahvenainen et al. |
| 2019/0300630 A1* | 10/2019 | Aarila et al. ............ C08F 2/001 |

FOREIGN PATENT DOCUMENTS

| | | |
|---|---|---|
| EP | 47077 A1 | 3/1982 |
| EP | 75049 A1 | 3/1983 |

(Continued)

OTHER PUBLICATIONS

English Translation of Russian Office Action for Russian Application No. 2019117277 dated Nov. 20, 2019, 7 pages.

(Continued)

*Primary Examiner* — Francis Tischler
(74) *Attorney, Agent, or Firm* — Lowenstein Sandler LLP

(57) ABSTRACT

Disclosed is a process for producing a multimodal ethylene polymer composition suitable for producing films by blow moulding. The process comprises
(i) copolymerising ethylene and an alpha-olefin comonomer in a first polymerisation step to produce a first ethylene copolymer (PE1);
(ii) copolymerising ethylene and an alpha-olefin comonomer in a second polymerisation step in the presence of the first ethylene copolymer to produce a first ethylene polymer mixture (PEM1), wherein the MFR$_2$ of PE1 is higher than the MFR$_2$ of PEM1; and
(iii) copolymerising ethylene and an alpha-olefin comonomer in a third polymerisation step in the presence of the PEM1 to produce a second ethylene polymer mixture (PEM2) having a density of from 915 to 925 kg/m$^3$ and a melt flow rate MFR$_5$ of from 0.3 to 5 g/10 min.

17 Claims, No Drawings

(56) References Cited

FOREIGN PATENT DOCUMENTS

| | | |
|---|---|---|
| EP | 372239 A2 | 6/1990 |
| EP | 428054 A1 | 5/1991 |
| EP | 479186 A2 | 4/1992 |
| EP | 628343 A1 | 12/1994 |
| EP | 683176 A1 | 11/1995 |
| EP | 688794 A1 | 12/1995 |
| EP | 699213 A1 | 3/1996 |
| EP | 1378528 A1 | 1/2004 |
| EP | 1415999 A1 | 5/2004 |
| EP | 1600276 A1 | 11/2005 |
| EP | 2067799 A1 | 6/2009 |
| EP | 2186833 A1 | 5/2010 |
| EP | 2228394 A1 | 9/2010 |
| EP | 2246369 A1 | 11/2010 |
| EP | 2246372 A1 | 11/2010 |
| EP | 2415598 A1 | 2/2012 |
| EP | 2883885 A1 | 6/2015 |
| EP | 2883887 A1 | 6/2015 |
| EP | 3109261 A1 | 12/2016 |
| FI | 921632 A | 10/1993 |
| FI | 933073 A | 1/1995 |
| FI | 935856 A | 6/1995 |
| GB | 1272778 A | 5/1972 |
| WO | 1994028032 A1 | 12/1994 |
| WO | 1996019503 | 6/1996 |
| WO | 1996032420 | 10/1996 |
| WO | 1999051646 | 10/1999 |
| WO | 2001055230 | 8/2001 |
| WO | 2002088194 | 11/2002 |
| WO | 2003066698 | 8/2003 |
| WO | 2004000902 A1 | 12/2003 |
| WO | 2006063771 A1 | 6/2006 |
| WO | 2008034630 A1 | 3/2008 |
| WO | 2012069400 A1 | 5/2012 |
| WO | 2013144328 A1 | 10/2013 |
| WO | 2015086812 A1 | 6/2015 |

OTHER PUBLICATIONS

Heino, et al.,"The Influence of Molecular Structure on Some Rheological Properties of Polyethylene", Annual Transactions of the Nordic Rheology Society, 1995, pp. 71-73.

Heino et al., "Rheological Characterization of Polyethylene Fractions", Theoretical and Applied Rheology, Proc. XIth Int. Congr. on Rheology, Brussels, Belgium, Aug. 17-21, 1992, pp. 360-362.

International Search Report for PCT/EP2017/079369 dated Jan. 25, 2018, 14 pages.

* cited by examiner

PROCESS FOR PRODUCING POLYOLEFIN FILM COMPOSITION AND FILMS PREPARED THEREOF

CROSS-REFERENCE TO RELATED APPLICATION(S)

This application is a national phase of International Application No. PCT/EP2017/079369, filed on Nov. 16, 2017, which claims the benefit of European Patent Application No. 16200759.5, filed on Nov. 25, 2016. The contents of these applications are hereby incorporated by reference in their entirety.

FIELD OF THE INVENTION

The present invention is directed to a method for producing multimodal ethylene polymer film compositions and films prepared thereof. Especially, the present invention is directed to a method for making multimodal ethylene copolymer film composition by a process comprising polymerizing ethylene in at least three polymerization stages. Further, the present invention is directed to films comprising the multimodal ethylene copolymer composition produced by the method comprising at least three polymerization stages. Further, the invention is directed to the use of such multimodal ethylene copolymer compositions for making films with improved processability and throughput.

RELATED ART AND PROBLEM TO BE SOLVED

It is known to produce ethylene copolymers suitable for producing films by copolymerizing ethylene in two polymerization stages, for instance from EP-A-691367 which discloses bimodal ethylene copolymers produced in two fluidized bed reactors.

Also WO-A-2004000902 discloses bimodal low density PE resins. The document does not disclose multimodal ethylene polymer composition produced in three polymerisation stage.

EP-A-2067799 discloses multimodal LLDPE resins which have been produced in two polymerization stages in a loop and a gas phase reactor in the presence of a ligand-modified catalyst. The document does not disclose a third polymerization stage.

EP-A-2246369 discloses LLDPE produced in the presence of a Ziegler-Natta catalyst with specific halogenated aluminium alkyl compounds as a cocatalyst. While the document briefly refers to two-stage polymerization its examples are one-stage polymerization runs. The document does not disclose any three-stage polymerization.

EP-A-2246372 discloses LLDPE produced in the presence of a Ziegler-Natta catalyst with a halogenated aluminium alkyl compounds as a cocatalyst. The document discloses ethylene copolymerisation in two-stage polymerization configuration. It's only generally mentioned that optionally additional reactors may be used. It does not, however, disclose the nature of the polymers produced in such stages and it exemplifies only two-stage polymerization.

EP-A-2228394 discloses LLDPE polymers produced in two polymerization stages using a multicomponent catalyst comprising titanium and vanadium compounds. The document discloses that it is possible to include further polymerization stages, such as a third and a fourth polymerization stage which are preferably conducted in gas phase. It does not, however, disclose the nature of the polymers produced in such stages and it exemplifies only two-stage polymerization.

EP-A-2186833 discloses a three-stage polymerization in a cascaded reactor sequence of two loop reactors followed by a gas phase reactor. In the first stage a polymer having an $MFR_2$ of preferably 200 to 1000 g/10 min and a density of preferably 945 to 978 $kg/m^3$ is produced. The polymer produced in the second stage is disclosed to have an $MFR_2$ of preferably 200 to 1000 g/10 min and a density of preferably 945 to 978 $kg/m^3$. The final polymer had an $MFR_{21}$ of preferably 5 to 30 g/10 min and a density of preferably 940 to 970 $kg/m^3$. The polymers produced in the first and second stages had the same $MFR_2$. In the exemplified process the polymers produced in the first two stages were homopolymers and the final resins had $MFR_5$ of from 0.2 to 0.4 g/10 min and density of about 955 $kg/m^3$.

EP2415598 discloses a multilayer film comprising at least one layer of a multimodal terpolymer, e.g. a bimodal linear low density ethylene/1-butene/$C_6$-$C_{12}$-alpha-olefin terpolymer. The multimodal polymer comprises a low molecular weight component corresponding ethylene homopolymer or a low molecular weight ethylene copolymer and a high molecular weight component corresponding to ethylene terpolymer with higher alpha-olefin comonomers. Preferably the low molecular weight component is an ethylene homopolymer and the high molecular weight component is ethylene/1-butene/1-hexene terpolymer. The multimodal terpolymer is produced in a two stage polymerisation process. Final densities are disclosed to be in the range of 910-950 $kg/m^3$ or 935-970 $kg/m^3$ or 900-935 $kg/m^3$; and $MFR_{21}$ (190° C., 21.6 kg load, ISO1133) 7 to 60 g/10 min or 2 to 35 g/10 min or 15 to 80 g/10 min, respectively.

WO 2015/086812 (EP2883887) describes a process for making multimodal ethylene copolymers where the method comprises polymerising ethylene and comonomers in three polymerisation stages, and further use of said copolymers for making films. The ethylene copolymer produced according to the process has the density of 906 to 925 $kg/m^3$ and $MFR_5$ (190° C., 5.0 kg load, ISO1133) of 0.5 to 5.0 g/10 min. The copolymer produced in the first polymerisation stage and the first copolymer mixture being a mixture of the first polymer and polymer produced in the second stage have claimed densities in the range of 945 to 955 $kg/m^3$ and melt flow rates $MFR_2$ in the range of 150 to 1000 $kg/m^3$.

EP2883885 describes similar type of polymers as described in WO 2015/086812.

Many unimodal or bimodal ethylene polymers have desired properties for different application needs. Suitable densities and melt flow rates are normal decisive features of polyethylene film materials. Such bimodal terpolymers are known in the state of the art and are described e.g. in WO 03/066698 or WO 2008/034630 or are commercially available, such as BorShape™ FX1001 and BorShape™ FX1002 (both from Borealis AG, Vienna, Austria).

Even though the basic properties (density, melt flow ratio and mechanical properties) of polyethylene composition for making films might be satisfactory with known polyethylene film compositions, there still remains a need to provide a polyethylene film composition having in addition improved throughput (output) and extrudability properties in film making processes. High throughput and excellent extrudability properties are very much appreciated by the film makers. Combination of desired properties of polymer film composition and good processability with high throughput in film making process is not discussed in related art publications.

SUMMARY OF THE INVENTION

As seen from one embodiment of the invention the present invention provides a process for producing a multimodal ethylene copolymer film composition comprising the steps of
(i) copolymerising ethylene and an alpha-olefin comonomer in a first polymerisation step in the presence of a polymerisation catalyst to produce a first ethylene copolymer (PE1) having a density of from 940 to 980 kg/m$^3$ and a melt flow rate $MFR_2$ of from 400 to 1000 g/10 min;
(ii) copolymerising ethylene and an alpha-olefin comonomer in a second polymerisation step in the presence of the first ethylene copolymer to produce a first ethylene polymer mixture (PEM1) comprising the first ethylene copolymer and a second ethylene copolymer (PE2), said first ethylene polymer mixture having a density of from 940 to 980 kg/m$^3$ and a melt flow rate $MFR_2$ of from 150 to 800 g/10 min, wherein the $MFR_2$ of the first ethylene copolymer (PE1) is higher than first ethylene polymer mixture (PEM1);
(iii) copolymerising ethylene and an alpha-olefin comonomer in a third polymerisation step in the presence of the first ethylene polymer mixture (PEM1) to produce a second ethylene polymer mixture (PEM2) comprising the first ethylene polymer mixture (PEM1) and a third ethylene copolymer (PE3), said second ethylene polymer mixture (PEM2) having a density of from 915 to 925 kg/m$^3$ and a melt flow rate $MFR_5$ of from 0.3 to 5 g/10 min.

As seen from another aspect, the present invention provides a process for producing a film, comprising the steps of
(i) copolymerising ethylene and an alpha-olefin comonomer in a first polymerisation step in the presence of a polymerisation catalyst to produce a first ethylene homo- or copolymer (PE1) having a density of from 940 to 980 kg/m$^3$ and a melt flow rate $MFR_2$ of from 400 to 1000 g/10 min;
(ii) copolymerising ethylene and an alpha-olefin comonomer in a second polymerisation step in the presence of a first ethylene copolymer to produce a first ethylene polymer mixture (PEM1) comprising the first ethylene copolymer and a second ethylene copolymer (PE2), said first ethylene polymer mixture having a density of from 940 to 980 kg/m$^3$ and a melt flow rate $MFR_2$ of from 150 to 800 g/10 min, wherein the $MFR_2$ of the first ethylene copolymer (PE1) is higher than first ethylene polymer mixture (PEM1);
(iii) copolymerising ethylene and an alpha-olefin comonomer in a third polymerisation step in the presence of the first ethylene polymer mixture to produce a second ethylene polymer mixture (PEM2) comprising the first ethylene polymer mixture and a third ethylene copolymer, said second ethylene polymer mixture having a density of from 915 to 925 kg/m$^3$ and a melt flow rate $MFR_5$ of from 0.3 to 5 g/10 min;
(iv) pelletizing the second polymer mixture and
(v) providing a film by blow moulding.

As seen from a further aspect, the present invention provides a multimodal ethylene-alpha-olefin copolymer film composition having density of from 915 to 925 kg/m$^3$ and a melt flow rate $MFR_5$ of from 0.3 to 5 g/10 min and comprising a first ethylene homo- or copolymer (PE1), a second ethylene copolymer (PE2) and a third ethylene copolymer (PE3), wherein the first ethylene homo- or copolymer (PE1) and the second ethylene copolymer (PE2) form a first ethylene polymer mixture (PEM1) and the first ethylene polymer mixture (PEM1) and the third ethylene copolymer (PE3) form the second ethylene polymer mixture (PEM2), and wherein I. the first ethylene homo- or copolymer (PE1) has a density of from 940 to 980 kg/m$^3$ and a melt flow rate $MFR_2$ of from 400 to 1000 g/10 min;
II. the first ethylene polymer mixture (PEM1) has a density of from 940 to 980 kg/m$^3$ and a melt flow rate $MFR_2$ of from 150 to 800 g/10 min, wherein the $MFR_2$ of the first ethylene copolymer (PE1) is higher than first ethylene polymer mixture (PEM1);
III. the second ethylene polymer mixture (PEM2) has a density of from 915 to 925 kg/m$^3$ and a melt flow rate $MFR_5$ of from 0.3 to 5 g/10 min;

Further, the present the present invention provides a film comprising the multimodal ethylene-alpha-olefin copolymer composition as defined above and or prepared by the method as herein described.

DETAILED DESCRIPTION

Polymerisation Process

The present process for producing polyethylene film composition comprises polymerisation of ethylene and at least one α-olefin in multiple polymerisation steps in the presence of a polymerisation catalyst. In the present application definition multiple polymerisation steps mean a process comprising at least three polymerisation steps.

The at least one α-olefin may be selected from α-olefins having from 4 to 10 carbon atoms and their mixtures. Especially suitable α-olefins are those having from 4 to 8 carbon atoms, including their mixtures. In particular 1-butene, 1-hexene and 1-octene and their mixtures are the preferred α-olefins. The α-olefin used in the different polymerisation steps may be the same or different.

The polymerisation steps may be connected in any order, i.e. the first polymerisation step may precede the second polymerisation step, or the second polymerisation step may precede the first polymerisation step or, alternatively, polymerisation steps may be connected in parallel. However, it is preferred to operate the polymerisation steps in cascaded mode.

Catalyst

The polymerisation is conducted in the presence of an olefin polymerisation catalyst. The catalyst may be any catalyst which is capable of producing all components of the multimodal ethylene copolymer. Suitable catalysts are, among others, Ziegler-Natta catalysts based on a transition metal, such as titanium, zirconium and/or vanadium or metallocene catalysts or late transition metal catalysts, as well as their mixtures. Especially Ziegler-Natta catalysts are useful as they can produce polymers within a wide range of molecular weight and other desired properties with a high productivity. Ziegler-Natta catalysts used in the present invention are supported on an external support.

Suitable Ziegler-Natta catalysts preferably contain a magnesium compound, an aluminium compound and a titanium compound supported on a particulate support.

The particulate support typically used in Ziegler-Natta catalysts comprises an inorganic oxide support, such as silica, alumina, titania, silica-alumina and silica-titania or a $MgCl_2$ based support. The catalyst used in the present invention is supported on an inorganic oxide support. Most preferably the Ziegler-Natta catalyst used in the present invention is supported on silica.

The average particle size of the silica support can be typically from 10 to 100 μm. However, it has turned out that special advantages can be obtained if the support has an average particle size from 15 to 30 μm, preferably from 18 to 25 μm. Alternatively, the support may have an average particle size of from 30 a 80 μm, preferably from 30 to 50 μm. Examples of suitable support materials are, for instance, ES747JR produced and marketed by Ineos Silicas (former Crossfield), and SP9-491, produced and marketed by Grace.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides, aluminium dialkyl chlorides and aluminium alkyl sesquichlorides.

The transition metal is preferably titanium. The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

The Ziegler-Natta catalyst is used together with an activator, which is also called as cocatalyst. Suitable activators are metal alkyl compounds, typically Group 13 metal alkyl compounds, and especially aluminium alkyl compounds. They include trialkylaluminium compounds, such as trimethylaluminium, triethylaluminium, tri-isobutylaluminium, trihexylaluminium and tri-n-octylaluminium. Aluminium alkyl compounds may also include alkyl aluminium halides, such as ethylaluminium dichloride, diethylaluminium chloride, ethylaluminium sesquichloride, dimethylaluminium chloride and the like and alkylaluminium oxy-compounds, such as methylaluminiumoxane, hexaisobutylaluminiumoxane and tetraisobutylaluminiumoxane and also other aluminium alkyl compounds, such as isoprenylaluminium. Especially preferred cocatalysts are trialkylaluminiums, of which triethylaluminium, trimethylaluminium and tri-isobutylaluminium are particularly preferred.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Prepolymerisation

In addition to the actual polymerisation steps, i.e. in the present invention in addition to the at least three polymerisation steps, the process may comprise a prepolymerisation step preceding the actual polymerisation steps. The purpose of the prepolymerisation is to polymerise a small amount of polymer onto the catalyst at a low temperature and/or a low monomer concentration. By prepolymerisation it is possible to improve the performance of the catalyst in slurry and/or modify the properties of the final polymer. The prepolymerisation step is conducted in slurry.

Thus, the prepolymerisation step may be conducted in a loop reactor. The prepolymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerisation step is typically from 0 to 90° C., preferably from 20 to 80° C. and more preferably from 55 to 75° C.

The pressure is not critical and is typically from 1 to 150 bar, preferably from 40 to 80 bar.

The amount of monomer is typically such that from about 0.1 to 1000 grams of monomer per one gram of solid catalyst component is polymerised in the prepolymerisation step. As the person skilled in the art knows, the catalyst particles recovered from a continuous prepolymerisation reactor do not all contain the same amount of prepolymer. Instead, each particle has its own characteristic amount which depends on the residence time of that particle in the prepolymerisation reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additive may be used to prevent the particles from adhering to each other or the walls of the reactor, as disclosed in WO-A-96/19503 and WO-A-96/32420.

The catalyst components are preferably all (separately or together) introduced to the prepolymerisation step when a prepolymerisation step is present. However, where the solid catalyst component and the cocatalyst can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

Typically, the amounts of hydrogen and comonomer are adjusted so that the presence of the prepolymer has no effect on the properties of the final multimodal polymer. Especially, it is preferred that melt flow rate of the prepolymer is greater than the melt flow rate of the final polymer but smaller than the melt flow rate of the polymer produced in the first polymerisation stage. It is further preferred that the density of the prepolymer is greater than the density of the final polymer. Suitably the density is approximately the same as or greater than the density of the polymer produced in the first polymerisation stage. Further, typically the amount of the prepolymer is not more than about 5% by weight of the multimodal polymer comprising the prepolymer.

First Polymerisation Step

The first polymerisation step typically operates at a temperature of from 20 to 150° C., preferably from 50 to 110° C. and more preferably from 60 to 100° C. The polymerisation may be conducted in slurry, gas phase or solution. In the first polymerisation step the first copolymer of ethylene is produced. The first ethylene copolymer has a density of from 940 to 980 kg/m$^3$ and a melt flow rate MFR$_2$ of from 400 to 1000 g/10 min.

The catalyst may be transferred into the first polymerisation step by any means known in the art. It is thus possible to suspend the catalyst in a diluent and maintain it as homogeneous slurry. Especially preferred it is to use oil having a viscosity form 20 to 1500 mPa·s as diluent, as disclosed in WO-A-2006/063771. It is also possible to mix the catalyst with a viscous mixture of grease and oil and feed the resultant paste into the first polymerisation step. Further still, it is possible to let the catalyst settle and introduce portions of thus obtained catalyst mud into the first polymerisation step in a manner disclosed, for instance, in EP-A-428054. The first polymerisation step may also be preceded by a prepolymerisation step, in which case the mixture withdrawn from the prepolymerisation step is directed into the first polymerisation step.

Into the first polymerisation step ethylene, the α-olefin, optionally an inert diluent, and optionally hydrogen are introduced. Hydrogen and the α-olefin are introduced in such amounts that the melt flow rate $MFR_2$ and the density of the first ethylene copolymer are in the desired values.

The α-olefin is as defined above having from 4 to 10 carbon atoms and their mixtures, and especially suitable α-olefins are those having from 4 to 8 carbon atoms, including their mixtures. In particular 1-butene, 1-hexene and 1-octene and their mixtures are the preferred α-olefins.

The polymerisation of the first polymerisation step may be conducted in slurry. Then the polymer particles formed in the polymerisation, together with the catalyst fragmented and dispersed within the particles, are suspended in the fluid hydrocarbon. The slurry is agitated to enable the transfer of reactants from the fluid into the particles.

The polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 1 to about 50% by mole, preferably from about 1.5 to about 20% by mole and in particular from about 2 to about 15% by mole. The benefit of having a high ethylene concentration is that the productivity of the catalyst is increased but the drawback is that more ethylene then needs to be recycled than if the concentration was lower.

The slurry polymerisation may be conducted in any known reactor used for slurry polymerisation. Such reactors include a continuous stirred tank reactor and a loop reactor. It is especially preferred to conduct the polymerisation in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

If the first ethylene copolymer is produced in conditions where the ratio of the α-olefin to ethylene is not more than about 400 mol/kmol, such as not more than 300 mol/kmol, then it is usually advantageous to conduct the slurry polymerisation above the critical temperature and pressure of the fluid mixture. Such operation is described in U.S. Pat. No. 5,391,654.

When the first polymerisation step is conducted as slurry polymerisation the polymerisation in the first polymerisation step is conducted at a temperature within the range of from 50 to 115° C., preferably from 70 to 110° C. and in particular from 80 to 105° C. The pressure in the first polymerisation step is then from 1 to 300 bar, preferably from 40 to 100 bar.

The amount of hydrogen is adjusted based on the desired melt flow rate of the first ethylene copolymer and it depends on the specific catalyst used. For many generally used Ziegler-Natta catalysts the molar ratio of hydrogen to ethylene is from 10 to 2000 mol/kmol, preferably from 20 to 1000 mol/kmol and in particular from 40 to 800 mol/kmol.

The amount of the α-olefin is adjusted based on the desired density of the first ethylene copolymer and it, too, depends on the specific catalyst used. For many generally used Ziegler-Natta catalysts the molar ratio of the α-olefin to ethylene is from 100 to 1000 mol/kmol, preferably from 150 to 600 mol/kmol.

The polymerisation of the first polymerisation step may also be conducted in gas phase. A preferable embodiment of gas phase polymerisation reactor is a fluidised bed reactor. There the polymer particles formed in the polymerisation are suspended in upwards moving gas. The gas is introduced into the bottom part of the reactor. The upwards moving gas passes the fluidised bed wherein a part of the gas reacts in the presence of the catalyst and the unreacted gas is withdrawn from the top of the reactor. The gas is then compressed and cooled to remove the heat of polymerisation. To increase the cooling capacity it is sometimes desired to cool the recycle gas to a temperature where a part of the gas condenses. After cooling the recycle gas is reintroduced into the bottom of the reactor. Fluidised bed polymerisation reactors are disclosed, among others, in U.S. Pat. Nos. 4,994,534, 4,588,790, EP-A-699213, EP-A-628343, FI-A-921632, FI-A-935856, U.S. Pat. No. 4,877,587, FI-A-933073 and EP-A-75049.

According to the preferred embodiment of present invention, the polymerisation of the first polymerisation step is conducted in slurry.

Further, suitably the polymerisation is conducted at a temperature exceeding the critical temperature of the fluid mixture and pressure exceeding the critical pressure of the fluid mixture.

According to the invention at least one α-olefin is present in the first polymerisation step, where the polymer produced in the first step is the first ethylene copolymer. Typically the density of the first ethylene copolymer is from 940 to 980 $kg/m^3$. The polymerisation is preferably conducted as a slurry polymerisation in liquid diluent at a temperature of from 75° C. to 100° C., such as from 80 to 95° C. and a pressure of from 30 bar to 100 bar, such as from 40 to 80 bar, like from 50 to 80 bar. The molar ratio of the α-olefin to ethylene is then from 100 to 1000 mol/kmol, and preferably from 150 to 600 mol/kmol. Then the molar ratio of hydrogen to ethylene is suitably from 100 to 1000 mol/kmol, preferably from 150 to 700 mol/kmol. $MFR_2$ of the first ethylene copolymer produced in the first polymerisation step is within the range 400 to 1000 g/10 min.

The polymerisation rate in the first polymerisation step is suitably controlled to achieve the desired amount of the first ethylene copolymer in the second ethylene polymer mixture. Preferably the second ethylene polymer mixture contains from 10 to 35% by weight, more preferably from 13 to 25% by weight and even more preferably from 14 to 22% by weight of the first ethylene copolymer. The polymerisation rate is suitably controlled by adjusting the ethylene concentration in the first polymerisation step. When the first polymerisation step is conducted as slurry polymerisation in the loop reactor the mole fraction of ethylene in the reaction mixture is suitably from 2 to 10% by mole and preferably from 3 to 8% by mole.

Second Polymerisation Step

The second homo- or copolymer of ethylene is produced in the second polymerisation step in the presence of the first copolymer of ethylene.

The second polymerisation step typically operates at a temperature of from 20 to 150° C., preferably from 50 to 110° C. and more preferably from 60 to 100° C. The polymerisation may be conducted in slurry, gas phase or solution. In the second polymerisation step the second copolymer of ethylene is produced in the presence of the first copolymer of ethylene. The first copolymer of ethylene (PE1) and the second copolymer of ethylene (PE2) together form the first ethylene polymer mixture (PEM1). The first ethylene polymer mixture has a density of from 940 to 980 kg/m$^3$ and a melt flow rate MFR$_2$ of from 150 to 800 g/10 min.

The first copolymer of ethylene (PE1) is transferred from the first polymerisation step to the second polymerisation step by using any method known to the person skilled in the art. If the first polymerisation step is conducted as slurry polymerisation in a loop reactor, it is advantageous to transfer the slurry from the first polymerisation step to the second polymerisation step by means of the pressure difference between the first polymerisation step and the second polymerisation step.

Into the second polymerisation step ethylene, optionally an inert diluent, and optionally hydrogen and/or the α-olefin are introduced. Hydrogen and the α-olefin, are introduced in such amounts that the melt flow rate MFR$_2$ and the density of the first ethylene polymer mixture are within the desired values.

The polymerisation of the second polymerisation step may be conducted in slurry in the same way as it was discussed above for the first polymerisation step.

The amount of hydrogen in the second polymerisation step is adjusted based on the desired melt flow rate of the first ethylene polymer mixture and it depends on the specific catalyst used. For many generally used Ziegler-Natta catalysts the molar ratio of hydrogen to ethylene is from 100 to 2000 mol/kmol, preferably from 200 to 1000 mol/kmol and in particular from 250 to 800 mol/kmol.

The amount of the α-olefin is adjusted based on the desired density of the first ethylene polymer mixture and it, too, depends on the specific catalyst used. For many generally used Ziegler-Natta catalysts the molar ratio of the α-olefin to ethylene is from 0 to 1000 mol/kmol, preferably from 0 to 800 mol/kmol and in particular from 0 to 700 mol/kmol.

The polymerisation of the second polymerisation step may also be conducted in gas phase in the same way as was discussed above for the first polymerisation step. Preferably the second polymerisation step is conducted in slurry phase as described above.

It is thus preferred to conduct the second polymerisation step for producing the first ethylene polymer mixture (PEM1) having MFR$_2$ of from 150 to 800 g/10 min, in slurry polymerisation. The molar ratio of hydrogen to ethylene is suitably from 250 to 1000 mol/kmol, preferably from 250 to 800 mol/kmol and in particular from 300 to 700 mol/kmol in the second polymerisation step.

Further, suitably the polymerisation is conducted at a temperature exceeding the critical temperature of the fluid mixture and pressure exceeding the critical pressure of the fluid mixture.

According to the present invention the α-olefin is present in the first polymerisation step and in the second polymerisation step. The density of the first ethylene copolymer is controlled by the molar ratio of the α-olefin to ethylene in the first polymerisation step and the density of the first ethylene polymer mixture is controlled by the molar ratio of the α-olefin to ethylene in the second polymerisation step. The molar ratio of the α-olefin to ethylene is then from 50 to 1000 mol/kmol, and preferably from 100 to 600 mol/kmol in the second polymerisation step.

The α-olefin used in the second polymerisation step may be the same or different as used in the first polymerisation step.

The polymerisation rate in the second polymerisation step is suitably controlled to achieve the desired amount of the second ethylene copolymer in the second ethylene polymer mixture. Preferably the second ethylene polymer mixture contains from 10 to 35% by weight, more preferably from 15 to 30% by weight and even more preferably from 16 to 26% by weight of the second ethylene copolymer. The polymerisation rate is suitably controlled by adjusting the ethylene concentration in the second polymerisation step. When the second polymerisation step is conducted as slurry polymerisation in the loop reactor the mole fraction of ethylene in the reaction mixture is suitably from 2 to 10% by mole and preferably from 3 to 8% by mole.

As indicated above the melt flow rate MFR$_2$ of the first ethylene copolymer (PE1) is in the range 400 to 1000 g/10 min and the melt flow rate MFR$_2$ of the first ethylene copolymer mixture (PEM1) is in the range 150 to 800 g/10 min and MFR$_2$(PE1)>MFR$_2$(PEM1). I.e. the MFR$_2$ of the polymer produced in the first reactor is higher than the polymer mixture produced in the second polymerisation reactor. According to a preferred embodiment the ratio of MFR$_2$(PEM1)/MFR$_2$(PE1) should be at most 0.8, preferably at most 0.7 indicating that the first polymer mixture (PEM1) is clearly a bimodal polymer in respect of molecular weight.

Third Polymerisation Step

In the third polymerisation step the second ethylene polymer mixture (PEM2) comprising the first ethylene polymer mixture (PEM1) and the third ethylene copolymer (PE3) is formed.

Into the third polymerisation step are introduced ethylene, at least one α-olefin having 4 to 10 carbon atoms, hydrogen and optionally an inert diluent. The polymerisation in third polymerisation step is conducted at a temperature within the range of from 50 to 100° C., preferably from 60 to 100° C. and in particular from 70 to 95° C. The pressure in the third polymerisation step is from 1 to 300 bar, preferably from 5 to 100 bar.

The polymerisation in the third polymerisation step may be conducted in slurry. The polymerisation may then be conducted along the lines as was discussed above for the first and second polymerisation steps.

The amount of hydrogen in the third polymerisation step is adjusted for achieving the desired melt flow rate of the second ethylene polymer mixture. The molar ratio of hydrogen to ethylene depends on the specific catalyst used. For many generally used Ziegler-Natta catalysts the molar ratio of hydrogen to ethylene is from 0 to 50 mol/kmol, preferably from 3 to 35 mol/kmol.

Furthermore, the amount of α-olefin having from 4 to 10 carbon atoms is adjusted to reach the targeted density. The ratio of the α-olefin (sum of α-olefins) to ethylene depends on the type of the catalyst and the type of the α-olefin. The ratio is typically from 100 to 1000 mol/kmol, preferably from 150 to 800 mol/kmol. If more than one α-olefin is used the ratio of the α-olefin to ethylene is the ratio of the sum of all the α-olefins to ethylene.

The α-olefin used in the third polymerisation step may be the same or different as used in the previous polymerisation steps. The α-olefin is preferably an α-olefin of 4 to 8 carbon atoms or mixtures thereof. In particular 1-butene, 1-hexene and 1-octene and their mixtures are the preferred α-olefins.

Alternatively, the polymerisation in the third polymerisation step may be, and preferably is, conducted in gas phase. In gas phase polymerisation using a Ziegler-Natta catalyst hydrogen is typically added in such amount that the ratio of hydrogen to ethylene is from 3 to 100 mol/kmol, preferably from 4 to 50 mol/kmol for obtaining the desired melt index of the second ethylene polymer mixture. The amount of α-olefin having from 4 to 10 carbon atoms is adjusted to reach the targeted density of the second ethylene polymer mixture. The ratio of the α-olefin to ethylene is typically from 100 to 1000 mol/kmol, preferably from 150 to 800 mol/kmol. If more than one α-olefin is used the ratio of the α-olefin to ethylene is the ratio of the sum of all the α-olefins to ethylene.

The gas phase reactor preferably is a vertical fluidised bed reactor. There the polymer particles formed in the polymerisation are suspended in upwards moving gas. The gas is introduced into the bottom part of the reactor. The upwards moving gas passes the fluidised bed wherein a part of the gas reacts in the presence of the catalyst and the unreacted gas is withdrawn from the top of the reactor. The gas is then compressed and cooled to remove the heat of polymerisation. To increase the cooling capacity it is sometimes desired to cool the recycle gas to a temperature where a part of the gas condenses. After cooling the recycle gas is reintroduced into the bottom of the reactor. Fluidised bed polymerisation reactors are disclosed, among others, in U.S. Pat. Nos. 4,994,534, 4,588,790, EP-A-699213, EP-A-628343, FI-A-921632, FI-A-935856, U.S. Pat. No. 4,877,587, FI-A-933073 and EP-A-75049.

When the second polymerisation step is conducted in slurry and the third polymerisation step is conducted in gas phase, the polymer is suitably transferred from the second polymerisation step into the third polymerisation step as described in EP-A-1415999. The procedure described in paragraphs [0037] to [0048] of EP-A-1415999 provides an economical and effective method for product transfer.

The conditions in the third polymerisation step are adjusted so that the resulting second ethylene polymer mixture (PEM2) has $MFR_5$ of from 0.3 to 5 g/10 min, preferably from 0.3 to 4 g/10 min, and especially from 0.4 to 3.0 g/10 min. Furthermore, the second ethylene polymer mixture has a density in the range of 915 to 925 kg/m³, preferably in the range of 918 to 925 kg/m³.

The polymerisation rate in the third polymerisation step is suitably controlled to achieve the desired amount of the third ethylene copolymer in the second ethylene polymer mixture. Preferably the second ethylene polymer mixture contains from 40 to 70% by weight, more preferably from 50 to 65% by weight and even more preferably from 53 to 63% by weight of the third ethylene copolymer. The polymerisation rate is suitably controlled by adjusting the ethylene concentration in the third polymerisation step. When the third polymerisation step is conducted in gas phase the mole fraction of ethylene in the reactor gas is suitably from 3 to 50% by mole and preferably from 5 to 30% by mole.

In addition to ethylene, comonomer and hydrogen the gas also comprises an inert gas. The inert gas can be any gas which is inert in the reaction conditions, such as a saturated hydrocarbon having from 1 to 5 carbon atoms, nitrogen or a mixture of the above-mentioned compounds. Suitable hydrocarbons having from 1 to 5 carbon atoms are methane, ethane, propane, n-butane, isobutane, n-pentane, isopentane and mixtures thereof.

Post Reactor Treatment

When the polymer has been removed from the polymerisation reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilisers, neutralisers, lubricating agents, nucleating agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276. Typically the specific energy input (SEI) is during the extrusion within the range of from 100 to 230 kWh/ton. The melt temperature is typically from 220 to 290° C.

Preferred Compositions

According to a preferred embodiment the second ethylene polymer mixture (PEM2) has $MFR_5$ of from 0.3 to 5 g/10 min, preferably from 0.3 to 4 g/10 min, and especially from 0.4 to 3.0 g/10 min and a density of from 915 to 925 kg/m³, preferably of from 918 to 925 kg/m³. According to the same embodiment the first ethylene copolymer (PE1) has a density of from 940 to 980 kg/m³ and a melt flow rate $MFR_2$ of from 400 to 1000 g/10 min, preferably from 500 to 800 g/10 min, and the first ethylene polymer mixture (PEM1) has a density of from 940 to 980 kg/m³ and a melt flow rate $MFR_2$ of from 150 to 800 g/10 min, and wherein the melt flow rate $MFR_2$ of the first ethylene copolymer (PE1) is higher than the melt flow rate $MFR_2$ of the first ethylene polymer mixture (PEM1). It is further preferred that the ratio $MFR_2$(PEM1)/$MFR_2$(PE1) is at most 0.8.

According to a more preferred embodiment the second ethylene polymer mixture (PEM2) has $MFR_5$ of from 0.3 to 4 g/10 min, and especially from 0.4 to 3.0 g/10 min and a density of 918 to 925 kg/m³. According to the same embodiment the first ethylene copolymer (PE1) has a density of from 940 to 980 kg/m$^3$ and a melt flow rate MFR$_2$ of from 500 to 800 g/10 min, and the first ethylene polymer mixture (PEM1) has a density of from 940 to 980 kg/m$^3$ and a melt flow rate MFR$_2$ of from 150 to 800 g/10 min, and wherein the melt flow rate MFR$_2$ of the first ethylene copolymer (PE1) is higher than the melt flow rate MFR$_2$ of the first ethylene polymer mixture (PEM1). In a further preferred embodiment the ratio MFR$_2$(PEM1)/MFR$_2$(PE1) is at most 0.8, more preferably at most 0.7.

The second ethylene polymer mixture comprises from 10 to 35% by weight of the first ethylene copolymer, from 10 to 35% by weight of the second ethylene copolymer and from 45 to 70% by weight of the third ethylene copolymer. Preferably the second ethylene polymer mixture comprises from 13 to 26% by weight of the first ethylene copolymer, from 16 to 26% by weight of the second ethylene copolymer and from 50 to 65% by weight of the third ethylene copolymer. Thus, the production split between the polymerisation steps 1, 2 and 3 is thus 10-35/10-35/45-70, preferably 13-26/16-26/50-65.

As described above the multimodal film composition of the present invention is produced in at least three polymerisation steps, and is a trimodal polyethylene composition.

Film

The film according to the present invention comprises the multimodal ethylene copolymer film composition, preferably a trimodal polyethylene film composition. In addition to the multimodal, preferably trimodal ethylene copolymer the film composition may also contain antioxidants, process stabilizers, slip agents, pigments, UV-stabilizers and other additives known in the art. Examples of stabilizers are hindered phenols, hindered amines, phosphates, phosphites and phosphonites. Examples of pigments are carbon black, ultramarine blue and titanium dioxide. Examples of other additives are e.g. clay, talc, calcium carbonate, calcium stearate, zinc stearate and antistatic additives like. The additives can be added as single components or as part of a masterbatch as is known in the art.

Suitable antioxidants and stabilizers are, for instance, 2,6-di-tert-butyl-p-cresol, tetrakis-[methylene-3-(3',5-di-tert-butyl-4'hydroxyphenyl)propionate]methane, octadecyl-3-3(3'5'-di-tert-butyl-4'-hydroxyphenyl)propionate, dilaurylthiodipropionate, distearylthiodipropionate, tris-(nonylphenyl)phosphate, distearyl-pentaerythritol-diphosphite and tetrakis(2,4-di-tert-butylphenyl)-4,4'-biphenylene-diphosphonite.

Some hindered phenols are sold under the trade names of Irganox 1076 and Irganox 1010 or commercially available blends thereof, like Irganox B561. Commercially available blends of antioxidants and process stabilizers are also available, such as Irganox B225 marketed by Ciba-Geigy.

Suitable acid scavengers are, for instance, metal stearates, such as calcium stearate and zinc stearate. They are used in amounts generally known in the art, typically from 300 ppm to 10000 ppm and preferably from 400 to 5000 ppm.

The polymer of the invention can be provided in the form of powder or pellets, preferably pellets. Pellets are obtained by conventional extrusion, granulation or grinding techniques and are an ideal form of the polymer of the invention because they can be added directly to converting machinery. Pellets are distinguished from polymer powders where particle sizes are less than 1 mm. The use of pellets ensures that the composition of the invention is capable of being converted in a film, e.g. monolayer film, by the simple in line addition of the pellets to the converting machinery.

The multimodal ethylene polymer film compositions of the invention allow the formation of films having good mechanical properties. The composition can be extruded to films according to any method known in the art. The film preparation process steps of the invention are known and may be carried out in a film line in a manner known in the art, such as flat film extrusion or blown film extrusion. Well known film lines are commercially available, for example from Windmöller & Hölscher, Reifenhauser, Hosokawa Alpine etc.

Importantly, the ethylene polymer compositions of the invention have extraordinary processing properties. Multimodality, especially trimodality, of the polyethylene film composition of the invention makes it very beneficial for making films. Benefits can be seen in excellent extrudability and especially in the clearly higher throughput in the film making machinery than corresponding film materials having the same level of density and MFR. The high throughput is not achieved at the expense of good mechanical properties. In the film making process the maximum output of the film composition of the invention with 40 µm film is at least 15% higher, preferably at least 20% higher, more preferably at least 25% higher, even more than 30% higher than with commercial film composition having corresponding MFR and density as composition of the invention.

Thus, the multimodal film composition of the invention is very attractive in film making point of view.

The films of the invention are preferably monolayer films or the polymer composition of the invention is used to form a layer within a multilayer film. Any film of the invention may have a thickness of 3 to 1000 µm, preferably 5 to 500 µm, more preferably 10 to 250 µm, still more preferably 10 to 150 µm, such as e.g. 10 to 100 µm, or even 10 to 60 µm. Selected thickness is dependent on the needs of the desired end application.

The compositions produced according to the process of the present invention are suitable for making blown films. The films of the invention can be manufactured using simple in line addition of the polymer pellets to an extruder. For film formation using a polymer mixture it is important that the different polymer components be intimately mixed prior to extrusion and blowing of the film as otherwise there is a risk of inhomogeneity, e.g. gels, appearing in the film. Thus, it is especially preferred to thoroughly blend the components, for example using a twin screw extruder, preferably a counter-rotating extruder prior to extrusion and film blowing. Sufficient homogeneity can also be obtained by selecting the screw design for the film extruder such that it is designed for good mixing and homogenizing. The film of the invention is a blown film. Blown films are typically produced by extrusion through an annular die, blowing into a tubular film by forming a bubble which is collapsed between nip rollers after solidification. This film can then be slit, cut or converted (e.g. gusseted) as desired. Conventional film production techniques may be used in this regard. Typically the composition will be extruded at a temperature in the range 160° C. to 240° C., and cooled by blowing gas (generally air) at a temperature of 10 to 50° C. to provide a frost line height of 1 or 2 to 8 times the diameter of the die. The blow up ratio (BUR) should generally be in the range 1.5 to 4, e.g. 2 to 4, preferably 2.5 to 3.

The films of the invention exhibit high dart impact strengths and tear strengths, especially in the machine direction. In the passages which follow, certain parameters are given based on a specific film thickness. This is because variations in thickness of the film cause a change to the size of the parameter in question so to obtain a quantitative value, a specific film thickness is quoted. This does not mean that the invention does not cover other film thicknesses rather it means that when formulated at a given thickness, the film should have the given parameter value.

Thus, for a 40 µm film manufactured as described below and at maximum output, Impact resistance on film (DDI) (ASTM D1709, method "A") may be at least 140 g, tensile modulus at least 300 (ISO 527-3).

EXAMPLES

Methods

The following methods were used to measure the properties that are defined generally above and in examples below. Unless otherwise stated, the film samples used for the measurements and definitions were prepared as described under the heading "Film Sample Preparation".

Melt Index (MI) or Melt Flow Rate (MFR)

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load, $MFR_5$ is measured under 5 kg load and $MFR_{21}$ is measured under 21.6 kg load.

Density

Density of the polymer was measured according to ISO 1183-2/1872-2B.

Impact Resistance on Film (DDI)

Impact resistance on film (DDI) was determined by Dart-drop (g/50%). Dart-drop was measured using ASTM D1709, method "A" (Alternative Testing Technique). A dart with a 38 mm diameter hemispherical head was dropped from a height of 0.66 m onto a film clamped over a hole. If the specimen failed, the weight of the dart was reduced and if it did not fail the weight was increased. At least 20 specimens were tested. One weight is used for each set and the weight is increased (or decreased) from set to set by uniform increments. The weight resulting in failure of 50% of the specimens was calculated and reported Tear Resistance (Determined as Elmendorf Tear (N))

The tear strength is measured using the ISO 6383/2 method. The force required to propagate tearing across a film specimen is measured using a pendulum device. The pendulum swings under gravity through an arc, tearing the specimen from a pre-cut slit. The specimen is fixed on one side by the pendulum and on the other side by a stationary clamp. The tear strength is the force required to tear the specimen. The relative tear resistance (N/mm) can be calculated by dividing the tear resistance by the thickness of the film. The films were produced as described below in the film preparation example. The tear strength is measured in machine direction (MD) and transverse direction (TD)

Tensile modulus (E-Mod (MPa) was measured in machine and transverse direction according to ISO 527-3 on film samples prepared as described under the Film Sample preparation with film thickness of 40 µm and at a cross head speed of 1 mm/min for the modulus.

Shear Thinning Index (SHI)

Rheological parameters such as Shear Thinning Index SHI and Viscosity were determined by using a Anton Paar Phisica MCR 300 Rheometer on compression moulded samples under nitrogen atmosphere at 190° C. using 25 mm diameter plates and plate and plate geometry with a 1.2 mm gap. The oscillatory shear experiments were done within the linear viscosity range of strain at frequencies from 0.05 to 300 rad/s (ISO 6721-1). Five measurement points per decade were made.

The values of storage modulus (G'), loss modulus (G") complex modulus (G*) and complex viscosity (η*) were obtained as a function of frequency (ω). $\eta_{100}$ is used as abbreviation for the complex viscosity at the frequency of 100 rad/s.

Shear thinning index (SHI), which correlates with MWD and is independent of Mw, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995).

SHI value is obtained by calculating the complex viscosities at given values of complex modulus and calculating the ratio of the two viscosities. For example, using the values of complex modulus of 5 kPa and 300 kPa, then η*(5 kPa) and η*(300 kPa) are obtained at a constant value of complex modulus of 5 kPa and 300 kPa, respectively. The shear thinning index $SHI_{5/300}$ is then defined as the ratio of the two viscosities η*(5 kPa) and η*(300 kPa), i.e. η(5)/η(300).

The films were prepared as described below in the film preparation method A.

Inventive Example IE1

A loop reactor having a volume of 50 dm³ was operated at a temperature of 70° C. and a pressure of 57 bar. Into the reactor were fed ethylene, 1-butene, propane diluent and hydrogen so that the feed rate of ethylene was 2.0 kg/h, of 1-butene 96 g/h, of hydrogen was 5 g/h and of propane was 55 kg/h. Also a solid polymerization catalyst component produced as described above and in Example 1 of EP 1378528 was introduced into the reactor together with triethylaluminium cocatalyst so that the molar ratio of Al/Ti was about 15. The estimated production rate was 1.3 kg/h.

A stream of slurry was continuously withdrawn and directed to a loop reactor having a volume of 150 dm³ and which was operated at a temperature of 95° C. and a pressure of 55 bar. Into the reactor were further fed additional ethylene, propane diluent and hydrogen so that the ethylene concentration in the fluid mixture was 4.1% by mole, the hydrogen to ethylene ratio was 515 mol/kmol and the fresh propane feed was 88 kg/h. The production rate was 14 kg/h. The resulting copolymer had $MFR_2$ of 550 g/10 min and density 956 kg/m³.

A stream of slurry from the reactor was withdrawn intermittently and directed into a loop reactor having a volume of 350 dm³ and which was operated at 95° C. temperature and 51 bar pressure. Into the reactor was further added a fresh propane, ethylene, and hydrogen so that the ethylene content in the reaction mixture was 3.4 mol-% and the molar ratio of hydrogen to ethylene was 337 mol/kmol and the molar ratio of 1-butene to ethylene was 188 mol/kmol. The ethylene copolymer withdrawn from the reactor had $MFR_2$ of 310 g/10 min and density of 960 kg/m³. The production rate was 24 kg/h.

The slurry was withdrawn from the loop reactor intermittently and directed to a flash vessel operated at a temperature of 50° C. and a pressure of 3 bar. From there the polymer was directed to a fluidized bed gas phase reactor operated at a pressure of 20 bar and a temperature of 80° C. Additional ethylene and 1-butene comonomer, nitrogen as inert gas and hydrogen were added so that the ethylene content in the reaction mixture was 11 mol-%, the ratio of hydrogen to ethylene was 5.4 mol/kmol and the molar ratio of 1-butene to ethylene was 463 mol/kmol. The polymer production rate in the gas phase reactor was 60 kg/h. and thus the total polymer withdrawal rate from the gas phase reactor was about 99 kg/h. The polymer had a melt flow rate $MFR_5$ of 1.26 g/10 min and a density of 923 kg/m$^3$. The production split (weight-% prepolymer/weight-% 1st step component/weight-% 2nd step component/weight-% 3rd step component) was 1/14/24/60.

The polymer powder was mixed under nitrogen atmosphere with 1200 ppm of Irganox B561 and 400 ppm Ca-stearate. Then it was compounded and extruded under nitrogen atmosphere to pellets by using a JSW CIMP90 twin screw extruder so that the SEI was 180 kWh/ton and the melt temperature 250° C. The pelletised resin had a melt flow rate $MFR_5$ of 1.2 g/10 min, density of 923 kg/m$^3$ and SHI(5/300)=59.

In Table 1 there is a summary of hydrogen and monomer feeds into polymerisation steps and density and MFR values of PE1, PEM1 and PEM2 of inventive polymerisation example IE1.

TABLE 1

|  | 1E1 |
|---|---|
| Prepol | |
| C2 kg/h | 2 |
| C4 g/h | 96 |
| H2 g/h | 5 |
| 1. reactor (loop) | |
| C2 mol% | 4,1 |
| H2/C2/mol/kmol | 515 |
| C4/C2/mol/kmol | 260 |
| MFR2/g/10 min | 550 |
| Density/kg(m3 | 956 |
| 2 reactor (loop) | |
| C2 mol% | 3,4 |
| H2/C2/mol/kmol | 337 |
| C4/C2/mol/kmol | 188 |
| PEM1 | |
| MFR2/g/10 min | 310 |
| Density/kg(m3 | 960 |
| 3. reactor (gas phase) | |
| C2 mol% | 11 |
| H2/C2/mol/kmol | 5,4 |
| C4/C2/mol/kmol | 463 |
| PEM2 | |
| MFR5/g/10 min | 1,3 |
| Density/kg(m3 | 923 |

Comparative Material CM 1

As comparative material 1 was used commercial linear low density polyethylene film grade Borstar® FB2230 having the density of 923 kg/m$^3$ and $MFR_5$ of 1.0 g/10 min. SHI(5/300)=59.

Film Preparation Method A

Blown films were made in 7-layer Alpine line under the following conditions: Extruder temperature settings were for all extruders: 220-230-230-230-230-235-235 in all test points.

Further the following parameters were used: Blow Up Ratio (BUR) of 3.0; frost line height of 900 mm, which is 3 times of die diameter (300 mm); and die gap of 1.5 mm. Layered structure of the monolayer film produced from 7-layer Alpine line of 14/14/14/14/14/15/15.

Blow Up Ratio (BUR) is defined to be Diameter of the bubble/Diameter of the die (represents TD orientation).

BUR indicates the increase in the bubble diameter over the die diameter. A blow-up ratio greater than 1 indicates that the bubble has been blown to a diameter greater than that of the die orifice. Maximum output rate (kg/h) was tested for materials at 40 micron film thickness.

Maximum output was restricted by extruder melt pressure limits. Individual throughputs of the extruders were adjusted so that in total max output (each extruder at max melt pressure) was reached. The maximum melt pressure for the Alpine line is 600 bars.

Film Sample Preparation

The blown film is wound to form reels which are followed by film cutting into respective dimension for further mechanical testing.

The compositions of CM 1 and IE1 were used in producing blown films according to Method A. Results are disclosed in Table 2.

TABLE 2

| | Max. output, kg/h | E-mod MD/M,Pa | DDI, F50, g | Tear MD/N | Tear TD/N |
|---|---|---|---|---|---|
| CM 1 | 240 | 334 | 186 | 31 | 301 |
| IE 1 | 320 | 322 | 159 | 31 | 307 |

What is claimed is:

1. A process for producing multimodal ethylene polymer film compositions comprising the steps of
   (i) copolymerising ethylene and an alpha-olefin comonomer in a first polymerisation step in the presence of a silica supported Ziegler-Natta polymerisation catalyst to produce a first ethylene copolymer (PE1) having a density of from 940 to 980 kg/m$^3$ and a melt flow rate $MFR_2$ of from 400 to 1000 g/10 min;
   (ii) copolymerising ethylene and an alpha-olefin comonomer in a second polymerisation step in the presence of the first ethylene copolymer to produce a first ethylene polymer mixture (PEM1) comprising the first ethylene copolymer and a second ethylene copolymer, said first ethylene polymer mixture having a density of from 940 to 980 kg/m$^3$ and a melt flow rate $MFR_2$ of from 150 to 800 g/10 min, and wherein the $MFR_2$ of the first ethylene copolymer (PE1) is higher than the $MFR_2$ of the first ethylene polymer mixture (PEM1) and
   (iii) copolymerising ethylene and an alpha-olefin comonomer in a third polymerisation step in the presence of the first ethylene polymer mixture to produce a second ethylene polymer mixture (PEM2) comprising the first ethylene polymer mixture and a third ethylene copolymer, said second ethylene polymer mixture having a density of from 918 to 925 kg/m$^3$ and a melt flow rate MFR5 of from 0.3 to 3 g/10 min, wherein the second ethylene polymer mixture (PEM2) comprises from 10 to 35% by weight of the first ethylene copolymer, from 10 to 35% by weight of the second ethylene copolymer and from 45 to 70% by weight of the third ethylene copolymer.

2. The process according to claim 1 wherein the α-olefin comonomer in at least one of steps (i), (ii), or (iii) is selected from the group consisting of α-olefins having from 4 to 10 carbon atoms and their mixtures.

3. The process according to claim 1 wherein the third polymerisation step is conducted in gas phase.

4. The process according to claim 1 wherein at least one of the first and the second polymerisation step is conducted as a slurry polymerisation in a loop reactor.

5. The process according to claim 4 wherein a diluent in the slurry polymerisation comprises at least 90% of hydrocarbons having from 3 to 5 carbon atoms.

6. The process according to claim 1, wherein a ratio $MFR_2(PEM1)/MFR_2(PE1)$ is at most 0.8.

7. A multimodal film composition having density of from 918 to 925 kg/m³ and a melt flow rate $MFR_5$ of from 0.3 to 3 g/10 min and produced according to claim 1.

8. A multimodal ethylene-alpha-olefin copolymer film composition produced according to the process of claim 1.

9. The multimodal film composition according to claim 8, wherein a ratio $MFR_2(PEM1)/MFR_2(PE1)$ is at most 0.8.

10. A process for producing a film, comprising the steps of
   (i) copolymerising ethylene and an alpha-olefin comonomer in a first polymerisation step in the presence of a silica supported Ziegler-Natta polymerisation catalyst to produce a first ethylene copolymer (PE1) having a density of from 940 to 980 kg/m³ and a melt flow rate $MFR_2$ of from 400 to 1000 g/10 min;
   (ii) copolymerising ethylene and an alpha-olefin comonomer in a second polymerisation step in the presence of the first ethylene copolymer to produce a first ethylene polymer mixture (PEM1) comprising the first ethylene copolymer and a second ethylene copolymer, said first ethylene polymer mixture having a density of from 940 to 980 kg/m³ and a melt flow rate $MFR_2$ of from 150 to 800 g/10 min, and wherein the $MFR_2$ of the first ethylene copolymer (PE1) is higher than first ethylene polymer mixture (PEM1);
   (iii) copolymerising ethylene and an alpha-olefin comonomer in a third polymerisation step in the presence of the first ethylene polymer mixture to produce a second ethylene polymer mixture (PEM2) comprising the first ethylene polymer mixture and a third ethylene copolymer, said second ethylene polymer mixture having a density of from 918 to 925 kg/m³ and a melt flow rate $MFR_5$ of from 0.3 to 3 g/10 min, wherein the second ethylene polymer mixture (PEM2) comprises from 10 to 35% by weight of the first ethylene copolymer, from 10 to 35% by weight of the second ethylene copolymer and from 45 to 70% by weight of the third ethylene copolymer;
   iv) pelletizing the second polymer mixture; and
   v) providing a film by blow molding.

11. The process according to claim 10 wherein the α-olefin comonomer in at least one of steps (i), (ii), or (iii) is selected from the group consisting of α-olefins having from 4 to 10 carbon atoms and their mixtures.

12. A film comprising the multimodal film composition of claim 7.

13. The process according to claim 2 wherein the α-olefin comonomer is selected from the group consisting of α-olefins having from 4 to 8 carbon atoms and their mixtures.

14. The process according to claim 4 wherein both the first and the second polymerisation steps are conducted as a slurry polymerisation in a loop reactor.

15. The process according to claim 1 wherein the second ethylene polymer mixture (PEM2) comprises from 13 to 26% by weight of the first ethylene copolymer, from 16 to 26% by weight of the second ethylene copolymer and from 50 to 65% by weight of the third ethylene copolymer.

16. The process according to claim 1 wherein the first ethylene copolymer has a melt flow rate $MFR_2$ of from 500 to 800 g/10 min.

17. The process according to claim 6, wherein a ratio $MFR_2(PEM1)/MFR_2(PE1)$ is at most 0.7.

* * * * *